United States Patent [19]
Furda et al.

[11] 3,973,049
[45] Aug. 3, 1976

[54] METHOD OF MIXING FLAVORS AND FIXED COMPOSITION COMPRISING DERIVATIZED SYNTHETIC POLYSACCHARIDES

[75] Inventors: Ivan Furda, Pleasantville; Peter Donato Malizia, Yonkers, both of N.Y.

[73] Assignee: General Foods Corporation, White Plains, N.Y.

[22] Filed: Mar. 14, 1974

[21] Appl. No.: 450,944

[52] U.S. Cl. .............................. 426/533; 426/534; 426/650; 426/658
[51] Int. Cl.² ............................................. A23L 1/22
[58] Field of Search ........... 426/175, 190, 227, 228, 426/365, 213, 222, 221, 590, 534, 533, 658, 650, 310; 260/234 R, 224

[56] References Cited
UNITED STATES PATENTS

| | | | |
|---|---|---|---|
| 2,661,349 | 12/1953 | Caldwell et al. | 260/234 R X |
| 2,999,858 | 9/1964 | Curbis | 260/234 R |
| 3,655,645 | 4/1972 | Tiehen | 260/234 R |
| 3,660,105 | 5/1972 | Kesterson et al. | 426/190 X |
| 3,758,549 | 9/1973 | Dexter et al. | 426/228 X |
| 3,898,347 | 8/1975 | Mitchell | 426/658 |

OTHER PUBLICATIONS

Whistler; Industrial Gums; Academic Press, N.Y. 1973; p. 239.

Primary Examiner—S. Leon Bashore
Assistant Examiner—Kenneth M. Schor
Attorney, Agent, or Firm—Doris M. Bennett; Daniel J. Donovan; Bruno P. Struzzi

[57] ABSTRACT

Synthetic polysaccharides when esterified with a substituted dicarboxylic acid anhydride furnish products possessing excellent oil fixative and stabilizing properties.

6 Claims, No Drawings

METHOD OF MIXING FLAVORS AND FIXED COMPOSITION COMPRISING DERIVATIZED SYNTHETIC POLYSACCHARIDES

BACKGROUND OF THE INVENTION

The present invention relates to improved fixatives for water insoluble flavors. More specifically it relates to the ability of synthetic polysaccharides which have been esterified with a substituted dicarboxylic acid anhydride to produce flavor fixatives having stabilizing properties.

There are several flavor fixatives for water insoluble flavors which have been proposed and are being used in the food and cosmetic industries. Many of these possess good flavor fixative properties but display a lack of stabilizing or antioxidative properties. Particularly in the food industry hydrocolloids such as gum arabic, gelatin or derivatized starches are considered to be good flavor fixatives as taught in the U.S. Pat. Nos. 3,554,768 issued Jan. 12, 1971, 3,736,149 issued May 29, 1973, and 3,264,114 issued Aug. 2, 1966. Although the aforementioned compounds have proved successful in terms of fixing unstable and water insoluble flavors, the addition of antioxidants in order to prevent the oxidation of the flavors is needed.

The practice of employing different starches which have been esterified with alkenyl succinic anhydride for use as emulsifiers is known in the art (U.S. Pat. No. 2,661,349). However, the alkenyl succinylated starches have only limited solubility in cold water and therefore would not be practical in terms of obtaining an improved fixative-stabilizer for water insoluble flavors.

This invention involves certain synthetic polysaccharides which when esterified with substituted dicarboxylic acid anhydrides, in addition to fixing flavors unexpectedly stabilize these water insoluble flavors as well.

SUMMARY OF THE INVENTION

It has been found that synthetic polysaccharides such as polyglucose, polymaltose, the polymalto-dextrins and the like when esterified with a substituted dicarboxylic acid anhydride such as 1-decenyl succinic anhydride or similar such homologs of succinic acid and the salts thereof, furnish products possessing excellent oil fixative and flavor-stabilizing properties. These derivatized synthetic polysaccharides are easy to prepare and can serve as alternative fixatives for water insoluble flavors and hydrophobic flavors in general. In addition, they can form highly concentrated aqueous solutions and are readily dispersible and more soluble in terms of absolute solubility, than starches, a distinct advantage when speaking in terms of flavor fixation.

The starting material of the present invention is a synthetic polysaccharide prepared by acid catylized polymerization of a reducing sugar such as glucose, maltose, fructose, mannose, a malto-dextrin or virtually any reducing sugar having free carbonyl groups capable of polymerization. Specifically, the synthetic polysaccharides may be prepared by acid catalized polymerization under vacuum ($10^{-5}$ to 10 mm Hg) at elevated temperatures (100°C–170°C) first taught by British Pat. No. 1,182,961 issued Mar. 4, 1970; U.S. Pat. No. 3,325,296 in *Advances in Carbohydrate Chemistry*, "Chemical Synthesis of Polysaccharides" Volume 21, 1966. The acids which may be employed are inorganic edible acids such as phosphoric acid, hydrochloric acid, and organic polycarboxylic acids such as fumaric acid, citric acid and the like. The polysaccharide may thereafter be purified as by solvent precipitation or ultrafiltration. Although such purification procedures tend to eliminate virtually all of the low molecular weight reaction products, such purification of these polysaccharides does not effect either the degree of polymerization or the degree of ultimate flavor fixation obtained.

The highly branched polymerized polysaccharides having a molecular weight range between 3,000 and 15,000 do not possess the flavor fixative properties for essential oils and water insoluble flavors. The salient point of this invention is that when the polymerized polysaccharides are further esterified with a substituted dicarboxylic acid anhydride such as 1-decyl succinic anhydride, or decenyl succinic anhydride, an end product is derived which not only has excellent fixative properties for water insoluble flavors, oils and the like, but more importantly prevents oxidation of these flavors during extended periods of storage. Such stabilization was not however observed when traditional flavor fixatives were tested, for example gum arabic, derivatized starches such as "Capsul" and "Mor-Rex."

The solution or emulsion of the esterified synthetic polysaccharide and water insoluble flavor to be fixed may be prepared according to any method known in the art to effect a homogenous mixture of the component parts such as blending, homogenization, etc. Thus, a simple homogeneous co-mixing of the two components to form an emulsion is sufficient. The mixture of the components is thereafter co-dried by methods known in the art such as freeze-drying, spray-drying, drum-drying, vacuum-drying or the like. Freeze-drying is preferred where a moderate fixation of the flavor is desired and where heat sensitive volatiles are concerned. However, where a strong retention is sought, where for example, it is preferable that the odor of the flavorant escape only after dissolution takes place, then spray-drying is preferably employed due to its encapsulating effect.

Due to the fact that flavors fixed with the esterified synthetic polysaccharides of this invention have improved stability over any fixed flavor known, the flavor fixative-stabilizers of this invention find potential utilization in numerous products where a stable aromatization is desirable.

DESCRIPTION OF THE INVENTION

The present invention is based on the discovery that when synthetic polysaccharides such as polyglucose, polymaltose or the polymalto-dextrines are esterified under alkaline conditions with a substituted dicarboxylic acid anhydride for example, 1-decenyl succinic anhydride, a material is produced which is not only an excellent oil or water insoluble flavor fixative but also demonstrates a stabilizing effect upon the flavor fixed therein.

A comparative study was made between the fixative materials of the present invention and gum arabic which is a well known flavor fixative employed in the art. The test material comprised three types of polyglucose prepared by different acid catalized polymerizations which had been esterified under alkaline conditions by n-decenyl succinic anhydride. The esterified polyglucose and gum arabic were evaluated under identical test conditions and were tested with the four typical constituents of citrus oil namely, limonene which forms a major part of citrus oil, linalool, ethyl butyrate and citral.

cate relative humidity and degrees Farenheit (RH/F°).

TABLE I

| Fixative | Flavor | "O" Time | 6 wks storage 85/90 |
|---|---|---|---|
| Phosphoric acid polymerized Polyglucose (Esterified with n-decenylsuccinic anhydride) | Ethyl Butyrate Limonene Linalool Citral | 48.73 ±100.00 ±100.00 ±100.00 | 15.28 75.43 73.32 56.67 |
| Hydrochloric acid polymerized Polyglucose (Esterified with n-decenylsuccinic anhydride) | Ethyl Butyrate Limonene Linalool Citral | 37.46 73.91 80.92 83.18 | 19.82 63.15 80.10 50.76 |
| Citric Acid polymerized Polyglucose (Esterified with n-decenylsuccinic anhydride) | Ethyl Butyrate Limonene Linalool Citral | 52.55 85.52 86.16 69.10 | 52.82 74.86 77.93 62.12 |
| Derivatized Starch Control Capsul | Ethyl Butyrate Limonene Linalool Citral | 36.36 78.38 84.91 91.97 | 36.73 (100% decomposition) 8.48 (90% decomposition) (100% decomposition) |
| Gum Arabic Control | Ethyl Butyrate Limonene Linalool Citral | 11.10 36.53 50.25 46.44 | 8.97 12.95 25.06 (50% decomposition) (100% decomposition) |

(1) One hundred twenty gram sample of gum arabic and (1) 120 gram of esterified polyglucose of this invention were separately dissolved in 360 ml of water. To each fixative solution was added 30 grams of the stock oil solution which comprised a 1:1:1:1 weight ratio of ethyl butyrate, limonene, linalool and citral. The mixture was blended at high speed for 45 seconds in a Waring blender and the resulting emulsions were freeze dried.

The polyglucose and gum arabic test samples were each stored under identical test conditions for six weeks in glasine pouches at 85° RH/90°F. After the six week period the oil fixed on gum arabic had gradually oxidized to the extent that practically all of the limonene and citral had decomposed to form by-products, in comparison to the polyglucose samples which had retained practically all of the stabilized flavoring components. The analysis was conducted as follows: 5 grams of each of the previously stored dry emulsions were dissolved in 25 mls of water. To this solution was added 0.25 grams of hexadecane (internal standard) and 62.5 mls of ether/methanol at a 4:1 respective volume ratio. The stock oil and hexadecane were thereby extracted into the organic layer and analized by GLC. In the polyglucose samples each of the four constituents of the dried emulsions namely, limonene, linalool, ethyl butyrate and citral eluted as pure components in contrast to the gum arabic-fixed flavors where the limonene and citral had decomposed to form by-products.

Table I represents a more detailed storage study conducted to determine the fixing and stabilizing affect the esterified polysaccharides of this invention have on water insoluble flavors in comparison to the well-known flavor fixatives gum arabic and "Capsul," a derivatized starch. It should be noted that no anti-oxidants were added to any sample tested.

The numerical values indicate the percent of fixed flavor recovered after the indicated period of storage. The values immediately below the storage period indi- As is evident from the above data the esterified polysaccharides all had an appreciable effect on both stabilization and retention of the fixed flavor components; of the polyglucose samples evaluated which were prepared by acid-catalyzed polymerization, th citric acid-catalyzed polyglucose appears to have the most pronounced effect on flavor retention.

In the interest of succinctness and clarity reference will henceforth be made principally to polyglucose and 1-decenyl succinic anhydride. It should be apparent to those skilled in the art that any synthetic polysaccharide prepared by the acid catalyzed polymerization of a reducing sugar having a free carbonyl group capable of polymerization and any substituted dicarboxylic acid anhydride containing a hydrophobic hydrocarbon chain or soluble salt thereof would function in the confines of this invention.

Basically the degree of esterification is determined indirectly by measuring the amount of 1-decenyl succinic anhydride or the soluble salt thereof that remains free after the reaction has taken place.

After the reaction between 1-decenyl succinic anhydride and polyglucose is completed the 1-decenyl succinilated polyglucose is then precipitated with an organic solvent such as ethanol; the concentration of the solvent in the final solution being in the range of 80% to 90%. The precipitated solids are then washed with the solvent and the washings combined and evaporated to a small volume. The solution is then acidified with an acid such as hydrochloric acid and the precipitated 1-decenyl succinic acid is extracted with ether. The ether extract is dried with sodium sulfate, evaporated to dryness and weighed. The weight corresponds to unreacted 1-decenyl succinic anhydride. The level of esterification of polyglucose usually ranges to a degree of about 1–5 percent which means that one to five anhydroglucose units out of 100 units are esterified.

In order to fix the flavor component, that is, the water insoluble flavor, oil, or hydrophobic flavor in general, an emulsion is formed by methods known in the art and is comprised of at least the flavor component and the esterified polysaccharide. This is most commonly effected by simply combining the constituent parts of the fixed flavor composition in water and mixing them at moderately high temperature. After a homogenous mixture is obtained, the emulsion may be dried by known methods.

The above explanation is for the purpose of teaching those skilled in the art how to practice the invention. Upon reading the above disclosure those skilled in the art will be aware of a number of modifications and variations. It is contemplated that these be included within the scope of the present invention which is defined by the following examples and claims. The following examples are presented for the purpose of further illustrating and explaining the present invention and are not to be taken as limiting in any sense.

EXAMPLE I

Synthetic polysaccharides such as polyglucose which have been prepared by the acid catalyzed polymerization of a reducing sugar may be esterified to give the improved fixing and stabilizing compositions of this invention in the following manner:

0.5 Grams of sodium carbonate is dissolved in 15 ml of water. Ten grams of polyglucose are added to the sodium carbonate alkaline solution.

One gram of decenyl succinic anhydride is added to the alkaline solution of the polyglucose and the mixture is stirred at room temperature for about 12 hours.

The pH of the solution is adjusted to 7 with dilute hydrochloric acid.

The 1-decenyl succinylated polyglucose is precipitated with ethanol (85 ml), and the precipitate is washed with ethanol and dried at reduced pressure in a vacuum oven.

EXAMPLE II

Flavoring agents may be fixed with the esterified polysaccharides of this invention according to the following method employed with the flavors and fixatives of Table I:

One hundred twenty grams of 1-decenyl succinilated polyglucose is dissolved in 360 mls of distilled water. Thirty grams of a stock solution consisting of a 1:1:1:1 weight ratio of ethyl butyrate, limonene, linalool and citral is added to the solution and the mixture is blended at a high speed in a Waring blender for 45 seconds. The resulting emulsion is quickly frozen and freeze dried in a freeze drier at $5.10^{-3}$ mmm Hg without heating for 18 to 20 hours.

The oil retention is analyzed at 0 times immediately after drying is completed and after six week storage in a glasine pouch at a relative humidity of 85 percent and at 90°F.

The analysis is conducted for each of six week samples as follows:

Five grams of the dried emulsion containing the oil constituents is dissolved in 25 cc of water. To this 0.25 gms of hexadecane (internal standard) is added. To this solution (in a 125 ml separating funnel) 62.5 ml of ether/methanol in a 4:1 perspective value ratio is added. The oil constituents and hexadecane are thereby extracted into the ether layer;

2 microliters of the ether layer then injected into a Perkin Elmer 900 GLC, 6 foot ⅛ inch metal column with OV 101–15 percent is used. The temperature of the gas chromatograph is programmed from 70 to 200°C at 6°C per minute.

EXAMPLE III

A procedure identical to that in Example II may be conducted with the exception that 1-decyl succinic anhydride is used in the place of decenyl succinic anhydride. The material prepared in this manner exhibits the same stabilizing properties as 1-decenyl derivative; however the level of initial fixation is lower.

We claim:
1. A method of improving the stability of a water insoluble flavor, oil and hydrophobic flavor against oxidation which method comprises fixing said flavors to a highly branched polymerized polysaccharide having been prepared by the acid catalyzed polymerization of a reducing sugar which polymerized polysaccharide has been further esterified with substituted dicarboxylic acid anhydride.

2. The method of claim 1 wherein the polysaccharide is polyglucose and the substituted dicarboxylic acid anhydride is 1-decenyl succinic anhydride.

3. The method of claim 1 wherein the flavor is fixed to the esterified polysaccharide by forming an emulsion of the flavor and esterified polysaccharide and co-drying the emulsion.

4. The method of claim 3 wherein the emulsion is co-dried by freeze-drying.

5. A fixed flavoring composition of improved stability against oxidation which comprises the flavoring fixed in a highly branched polymerized polysaccharide having been prepared by the acid catalyzed polymerization of a reducing sugar which polymerized polysaccharide has been further esterified with substituted dicarboxylic acid anhydrides.

6. The composition of claim 5 wherein the polysaccharide is polyglucose and the substituted dicarboxylic acid anhydride is 1-decenyl succinic anhydride.

* * * * *